United States Patent
Lin et al.

(10) Patent No.: US 11,271,472 B2
(45) Date of Patent: Mar. 8, 2022

(54) OVER TEMPERATURE COMPENSATION CONTROL CIRCUIT

(71) Applicant: DELTA ELECTRONICS, INC., Taoyuan (TW)

(72) Inventors: Cheng-Yi Lin, Taoyuan (TW); Hung-Wen Chueh, Taoyuan (TW); Chun-Chih Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/866,942

(22) Filed: May 5, 2020

(65) Prior Publication Data
US 2021/0135562 A1 May 6, 2021

(30) Foreign Application Priority Data
Nov. 5, 2019 (CN) .......................... 201911070839.1

(51) Int. Cl.
| | |
|---|---|
| *G05F 1/46* | (2006.01) |
| *H02M 1/32* | (2007.01) |
| *G05F 1/567* | (2006.01) |
| *H02M 1/36* | (2007.01) |
| *H02H 1/00* | (2006.01) |
| *H02M 7/537* | (2006.01) |

(52) U.S. Cl.
CPC ............ *H02M 1/36* (2013.01); *H02H 1/0007* (2013.01); *H02M 7/537* (2013.01); *G05F 1/462* (2013.01); *G05F 1/463* (2013.01); *G05F 1/567* (2013.01); *H02M 1/327* (2021.05)

(58) Field of Classification Search
CPC ........ H02M 1/327; G05F 1/462; G05F 1/463; G05F 1/567
USPC ......... 323/274–277, 284–285, 907; 361/93.8
See application file for complete search history.

(56) References Cited

U.S. PATENT DOCUMENTS

| | | | | |
|---|---|---|---|---|
| 5,408,401 | A * | 4/1995 | Miyazaki | ................ G05F 1/567 363/21.08 |
| 9,362,830 | B2 * | 6/2016 | Li | ...................... H02M 3/33507 |
| 9,600,005 | B2 * | 3/2017 | Hayashi | ................ H02M 3/156 |
| 9,618,951 | B2 * | 4/2017 | Kobayashi | ................ G05F 1/56 |
| 9,819,173 | B2 * | 11/2017 | Endo | ....................... G05F 1/567 |
| 2014/0176018 | A1 * | 6/2014 | Szczeszynski | ..... H05B 45/3725 315/307 |
| 2015/0249391 | A1 * | 9/2015 | Yang | ................ H02M 3/33576 363/21.01 |

* cited by examiner

*Primary Examiner* — Gary A Nash
(74) *Attorney, Agent, or Firm* — Muncy, Geissler, Olds & Lowe, P.C.

(57) ABSTRACT

An over temperature compensation control circuit is coupled to a conversion unit. The over temperature compensation control circuit includes a detection circuit, a temperature control resistor, and a comparison unit. The detection circuit provides a current signal responsive to an input voltage according to a voltage signal responsive to the input voltage of the conversion unit. The temperature control resistor generates a temperature control voltage according to the current signal. The comparison unit compares the temperature control voltage with a reference voltage to generate a control signal. The control signal represents whether a temperature of the conversion unit reaches an over temperature protection point.

15 Claims, 7 Drawing Sheets

OVER TEMPERATURE COMPENSATION CONTROL CIRCUIT

BACKGROUND

Technical Field

The present disclosure relates to an over temperature compensation control circuit, and more particularly to an over temperature compensation control circuit with dynamic over temperature protection points.

Description of Related Art

The statements in this section merely provide background information related to the present disclosure and do not necessarily constitute prior art.

In order to ensure personal safety, property, and the environment are not harmed or lost, the safety specifications of the products are usually set when the electronic products are shipped from the factory. Furthermore, in order to avoid the loss of personal safety, property, and environment caused by the excessive temperature of electronic products, the temperature of the electronic products during operation usually has relatively strict safety regulations.

Due to the requirements of future safety regulations, the system's or device's over temperature protection point must be less than 87° C. regardless of the input voltage. However, the magnitude of the input voltage usually affects the input current, and the magnitude of the input current affects the system's or device's temperature. Therefore, for the traditional over temperature protection design, the influence of the input voltage will cause the over temperature protection point to shift and lose its protection effect.

Therefore, how to design an over temperature compensation control circuit that provides adjustable over temperature protection points according to different input voltages so that whether the input voltage is low or high, the system or device can normally activate the over temperature protection when the system or device reaches the temperature protection point is an important subject for the inventors of this present disclosure.

SUMMARY

In order to solve the aforementioned problems, an over temperature compensation control circuit is provided. The over temperature compensation control circuit is coupled to a conversion unit. The over temperature compensation control circuit includes a detection circuit, a temperature control resistor, and a comparison unit. The detection circuit is coupled to the conversion unit and provides a current signal responsive to an input voltage according to a voltage signal responsive to the input voltage of the conversion unit. The temperature control resistor is coupled to the detection circuit and generates a temperature control voltage according to the current signal. The comparison unit is coupled to the temperature control resistor and generates a control signal by comparing the temperature control voltage with a reference voltage. The control signal represents whether a temperature of the conversion unit reaches an over temperature protection point.

In order to solve the aforementioned problems, an over temperature compensation control circuit is provided. The over temperature compensation control circuit is coupled to a conversion unit. The over temperature compensation control circuit includes a detection circuit, a temperature control resistor, and a comparison unit. The detection circuit is coupled to the conversion unit and provides a reference voltage responsive to an input voltage according to a voltage signal responsive to the input voltage. The temperature control resistor generates a temperature control voltage according to a current signal. The comparison unit is coupled to the detection circuit and the temperature control resistor and generates a control signal by comparing the temperature control voltage with the reference voltage. The control signal represents whether a temperature of the conversion unit reaches an over temperature protection point.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
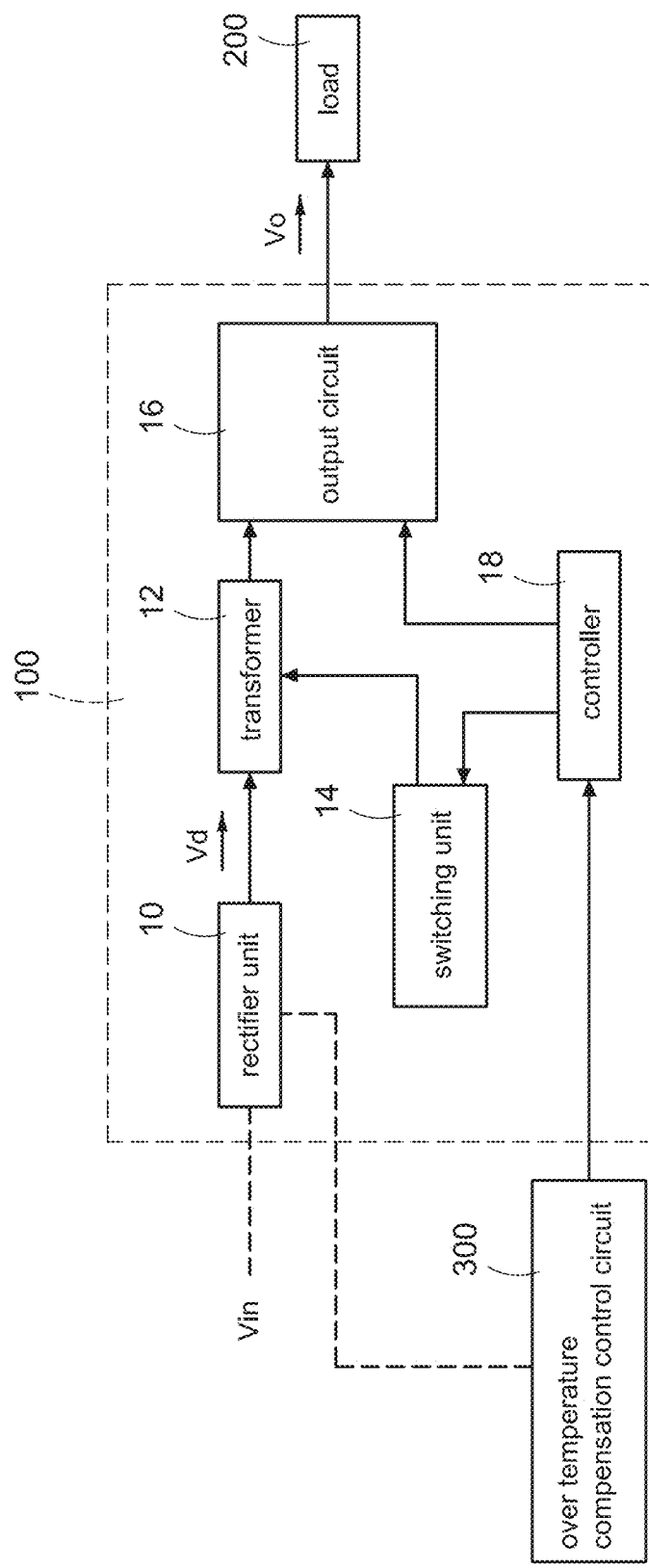
FIG. 1 is a block circuit diagram of a conversion unit of an over temperature compensation control circuit according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a conversion unit of an over temperature compensation control circuit according to the present disclosure. The conversion unit 100 receive an input voltage Vin and converts the input voltage Vin into an output voltage Vo. The conversion unit 100 includes a rectifier unit 10, a transformer 12, a switching unit 14, an output circuit 16, and a controller 18. A primary side of the transformer 12 is coupled to the rectifier unit 10 and the switching unit 14, and a secondary side of the transformer 12 is coupled to the output circuit 16. The controller 18 controls the switching unit 14 and the output circuit 16 so that the conversion unit 100 can convert the input voltage Vin into the output voltage Vo. Specifically, the rectifier unit 10 rectifies the input voltage Vin into a DC voltage Vd, the DC voltage Vd is switched by the switching unit 14 and coupled by the transformer 12 to the output circuit 16, and the output circuit 16 rectifies the voltage into the output voltage Vo to a load 200.

The over temperature compensation control circuit 300 is coupled to the conversion unit 100 and sets over temperature protection points according to a magnitude of the input voltage Vin. The over temperature compensation control circuit 300 can be arranged on the primary side of the transformer 12 for detecting an ambient temperature on the primary side. E.g., the over temperature compensation control circuit 300 can be coupled to the primary side, the rectifier unit 10, or the input voltage Vin (expressed in dotted lines). When an operation temperature of the conversion unit 100 reaches to the over temperature protection point, the over temperature compensation control circuit 300 provides an over temperature protection to prevent the conversion unit 100 from being damaged due to excessive temperature. In particular, the conversion unit 100 may be an electronic device or a power supply apparatus inside a system, and the conversion unit 100 may be a switching converter with an isolated transformer.

Since the voltage values of the common commercial powers in different countries in the world are not the same, the conversion unit 100 is designed to accept an input voltage Vin with a wide range of voltage value (e.g., but not limited to AC 90 volts-264 volts) so that the conversion unit 100 can be applicable to all countries in the world. On the condition of the same output power, when the input voltage Vin is lower (e.g., AC 90 volts), larger input current would result in higher temperature on the primary side of the transformer 12; when the input voltage Vin is higher (e.g., AC 264 volts), lower input current would result in lower temperature on the primary side of the transformer 12. Regardless of whether the input voltage Vin is high or low, however, the current on the secondary side is the same so that the temperature on the secondary side of the transformer 12 is similar. In other words, when the current on the secondary side is large enough to make the over temperature condition occur, the primary side of the transformer 12 may have a small input current due to a high input voltage so that the temperature on the primary side has not reached the temperature protection point.

In general, the temperature control resistor is located on the primary side. When an over temperature condition has occurred on the secondary side, if the over temperature protection point is set to a fixed value (e.g., the current flowing through the temperature control resistor is a fixed value, the over temperature determination is implemented only by the changed of the resistance value of the temperature control resistor), the larger input current can make the temperature of the conversion unit 100 be easily reached to the temperature protection point. But in the same situation, the smaller input current can make the primary side temperature of the conversion unit 100 low so that the temperature control resistor is still in a safe range and does not easily reach the over temperature protection point.

In the above situation, it may cause that the overall temperature of the conversion unit 100 has exceeded the over temperature protection point, but the over temperature compensation control circuit 300 provided on the primary side of the transformer 12 has not reached the temperature protection point due to the small input current such that the over temperature protection has not been triggered. Therefore, the main object and effect of the present disclosure is to provide a dynamic over temperature protection point for the conversion unit 100 so that the over temperature compensation control circuit 300 can be correctly triggered to provide the over temperature protection regardless of the magnitude of the input voltage Vin.

In an embodiment of the present disclosure, if the over temperature compensation control circuit 300 is disposed on the secondary side of the transformer 12 to detect the ambient temperature on the secondary side, since the signal on the secondary side is transmitted back to the controller 18 on the primary side, it must also be transmitted through an isolated coupling unit to increase the costs of the coupling unit and the overall circuit. Therefore, the over temperature compensation control circuit 300 of the present disclosure disposed on the primary side of the transformer 12 can achieve the effect of saving circuit costs.

Figure 2A:
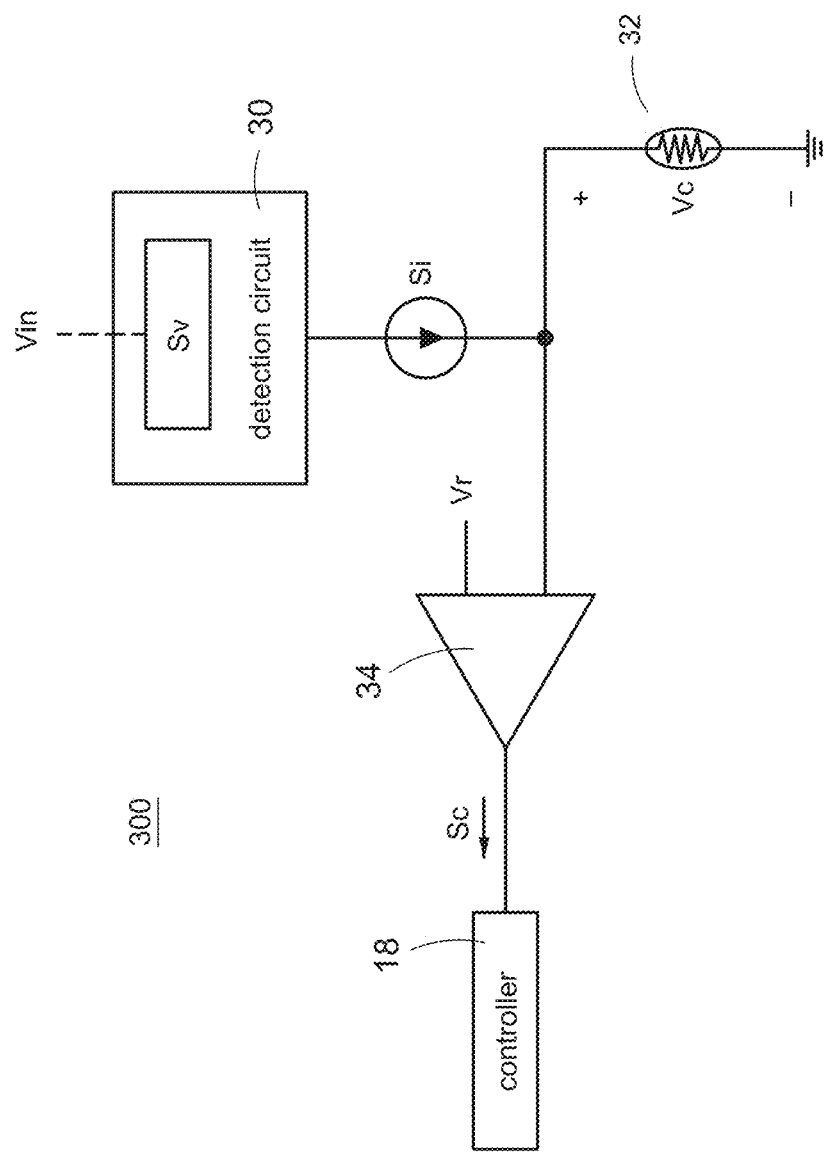
FIG. 2A is a block circuit diagram of the over temperature compensation control circuit according to a first embodiment of the present disclosure.

Please refer to FIG. 2A, which shows a block circuit diagram of the over temperature compensation control circuit according to a first embodiment of the present disclosure, and also refer to FIG. 1. The over temperature compensation control circuit 300 includes a detection circuit 30, a temperature control resistor 32, and a comparison unit 34. The temperature control resistor 32 is coupled to the detection circuit 30 and the comparison unit 34. The detection circuit 30 is coupled to the primary side of the transformer 12, and the detection circuit 30 provides a current signal Si in response to the input voltage Vin to the temperature control resistor 32 according to a voltage signal Sv in response to the input voltage Vin. The temperature control resistor 32 may be a thermistor with a negative temperature coefficient (NTC), that is, when the ambient temperature is higher, the resistance value of the temperature control resistor 32 is smaller, and when the ambient temperature is lower, the resistance value of the temperature control resistor 32 is larger. When the current signal Si flows through the temperature control resistor 32, a temperature control voltage Vc is generated on the temperature control resistor 32, and the temperature control voltage Vc is responsive to the current signal Si and the temperature control resistor 32.

The comparison unit 34 compares the temperature control voltage Vc with a reference voltage Vr and provides a control signal Sc according to the comparison results. The value of the control signal Sc represents whether the temperature of the conversion unit 100 (the primary side of the transformer 12) has reached the over temperature protection point. In one embodiment, the control signal Sc is a logic level signal. When the reference voltage Vr is greater than or equal to the temperature control voltage Vc, the control signal Sc is a high logic level signal (it represents an over temperature condition); when the reference voltage Vr is less than the temperature control voltage Vc, the control signal Sc is a low logic level signal (it represents not the over temperature condition).

The detection circuit 30 of this embodiment can dynamically adjust the magnitude of the current signal Si flowing through the temperature control resistor 32 according to the input voltage Vin, thereby dynamically adjusting the over temperature protection point. Specifically, when the reference voltage Vr is greater than the temperature control voltage Vc (the higher the ambient temperature, the smaller the resistance value of the temperature control resistor 32, and the smaller the temperature control voltage Vc under the same current signal Si), it means that the over temperature condition has occurred at this time. Therefore, the over temperature compensation control circuit 300 outputs the control signal Sc with the high logic level to inform the controller 18 to perform a protection mechanism.

In addition, under the same ambient temperature (e.g., the ambient temperature is the temperature of the over temperature point), the detection circuit 30 adjusts the value of the current signal Si corresponding to the output thereof according to the magnitude of the input voltage Vin. For example, when the input voltage Vin is larger, the value of the current signal Si is correspondingly reduced to lower the temperature control voltage Vc to be less than the reference voltage Vr and trigger the over temperature protection. Therefore, when the over temperature condition has occurred, the primary side temperature does not reach the over temperature point due to the temperature control resistor 32 provided on the primary side since the input voltage Vin is too larger and the input current is too small so that the resistance value is still in the safe range and the temperature control voltage Vc is still greater than the reference voltage Vr. In one embodiment, the controller 18 is coupled to the comparison unit 34, and determines whether the temperature of the conversion unit 100 reaches the over temperature protection point according to the control signal Sc so that the conversion unit 100 can correctly activate the over temperature protection.

The controller 18 provides at least two ways of over temperature protection. One of the two ways, the controller 18 sets a temperature hysteresis interval, and the temperature hysteresis interval includes an over temperature protection point and a under temperature resetting point. When the controller 18 realizes that the temperature of the conversion unit 100 reaches the over temperature protection point (e.g., 100° C.) according to the control signal Sc, the controller 18 turns off the conversion unit 100. That is, the controller 18 directly or indirectly controls the switching unit 14 and the output circuit 16 to stop working so that the conversion unit 100 no longer converts the input voltage Vin into the output voltage Vo.

Afterward, when the temperature of the conversion unit 100 reduces to the under temperature resetting point (e.g., 70° C.), the controller 18 resets the conversion unit 100 so that the conversion unit 100 restarts to convert the input voltage Vin into the output voltage Vo. Therefore, it is avoided that the temperature happens near the temperature protection point, and the conversion unit 100 repeatedly and frequently controls its start and stop to make the conversion unit 100 lose the operational stability.

The other of the two ways, the controller 18 locks the conversion unit 100. When the controller 18 realizes that the temperature of the conversion unit 100 reaches the over temperature protection point according to the control signal Sc, the controller 18 turns off and lock the conversion unit 100. At this condition, the input voltage Vin needs to be removed and re-powered so that the lock of the over temperature protection can be released, and the conversion unit 100 is restored to re-convert the input voltage Vin into the output voltage Vo. In one embodiment of the present disclosure, the over temperature protection mode of the controller 18 can be designed according to the working environment of the conversion unit 100, and therefore the over temperature protection mode is not limited to only the above two protection manners.

Figure 2B:
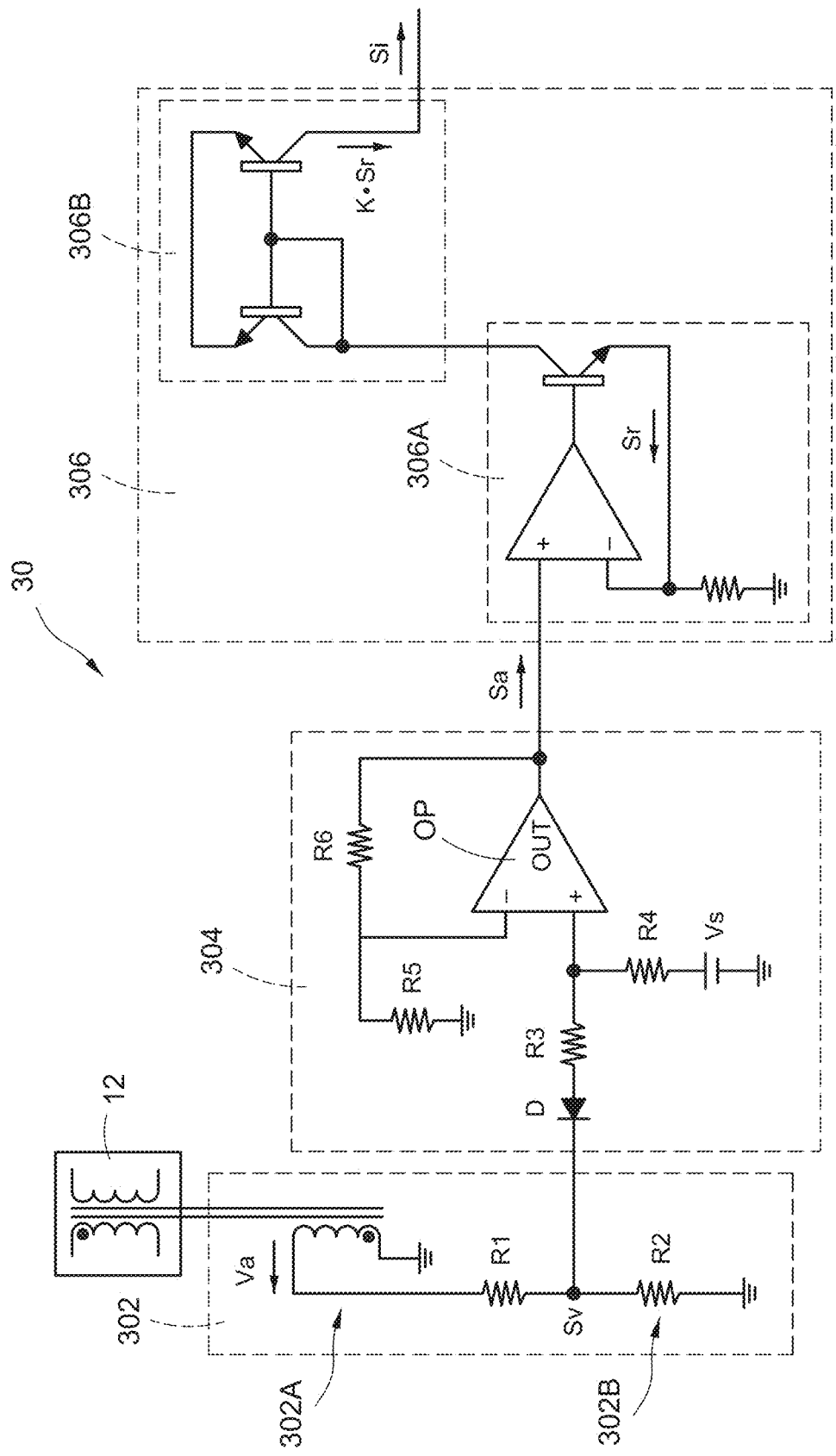
FIG. 2B is a circuit diagram of a detection circuit of the over temperature compensation control circuit according to the first embodiment of the present disclosure.

Please refer to FIG. 2B, which shows a circuit diagram of a detection circuit of the over temperature compensation control circuit according to the first embodiment of the present disclosure, and also refer to FIG. 1 to FIG. 2A. The detection circuit 30 includes a voltage detection circuit 302, an amplifier circuit 304, and a current mirror circuit 306. The amplifier circuit 304 is coupled to the voltage detection circuit 302 and the current mirror circuit 306. The voltage detection circuit 302 includes an auxiliary induction winding 302A and a voltage division circuit 302B, and the auxiliary induction winding 302A is coupled to the primary side of the transformer 12 and the voltage division circuit 302B. The auxiliary induction winding 302A induces an auxiliary voltage Va by means of electromagnetic coupling the primary side of the transformer 12 so that the magnitude of the auxiliary voltage Va is responsive to the magnitude of the input voltage Vin. The auxiliary voltage Va is larger when the magnitude of the input voltage Vin is larger, and the auxiliary voltage Va is smaller when the magnitude of the input voltage Vin is smaller. Since the auxiliary induction winding 302A is exactly opposite in polarity to the primary side winding of the transformer 12 so that the auxiliary voltage Va induced by the auxiliary induction winding 302A is a negative voltage value. The voltage division circuit 302B includes series-connected a first resistor R1 and a second resistor R2. The auxiliary voltage Va is divided by the first resistor R1 and the second resistor R2 to generate the voltage signal Sv between the first resistor R1 and the second resistor R2.

The amplifier circuit 304 includes a diode D, a first voltage division circuit R3, R4, a voltage source Vs, a feedback loop R5, R6, and an amplifier OP. The diode D is coupled to the first resistor R1, the second resistor R2, and the first voltage division circuit R3, R4, and the first voltage division circuit R3, R4 is coupled to the voltage source Vs and a non-inverting input end (+) of the amplifier OP. The feedback loop R5, R6 is coupled to an inverting input end (−) and an output end OUT of the amplifier OP, and the output end OUT of the amplifier OP is coupled to the current mirror circuit 306. The diode D is used to prevent the voltage difference between the voltage signal Sv and the voltage source Vs from generating a current path in the direction of the voltage source Vs. The first voltage division circuit R3, R4 and the feedback loop R5, R6 provide an amplification gain so that the amplifier circuit 304 can inversely amplify the voltage signal Sv to a voltage adjustment signal Sa with a positive voltage value. The voltage value of the voltage adjustment signal Sa is inversely proportional to the voltage value of the input voltage Vin.

Further, the input voltage is converted into the DC power source by the rectifier unit, and the DC power source can be coupled to the negative voltage of the auxiliary winding. The negative voltage of the auxiliary winding is provided to determine whether the input voltage is high voltage or low voltage so the detection signal can be determined only by the negative voltage. The current mirror circuit 306 includes a current generation circuit 306A and a current mirror unit 306B. The current generation circuit 306A is coupled to the output end OUT of the amplifier OP and the current mirror unit 306B, and the current mirror unit 306B is coupled to the temperature control resistor 32 and the comparison unit 34. The voltage adjustment signal Sa generates a current adjustment signal Sr through the current generation circuit 306A. The current mirror unit 306B generates the current signal Si corresponding to the current adjustment signal Sr (that is, the current signal Si is K times the current adjustment signal Sr, and K is constant). The current value of the current signal Si is inversely proportional to the voltage value of the input voltage Vin.

Figure 2C:
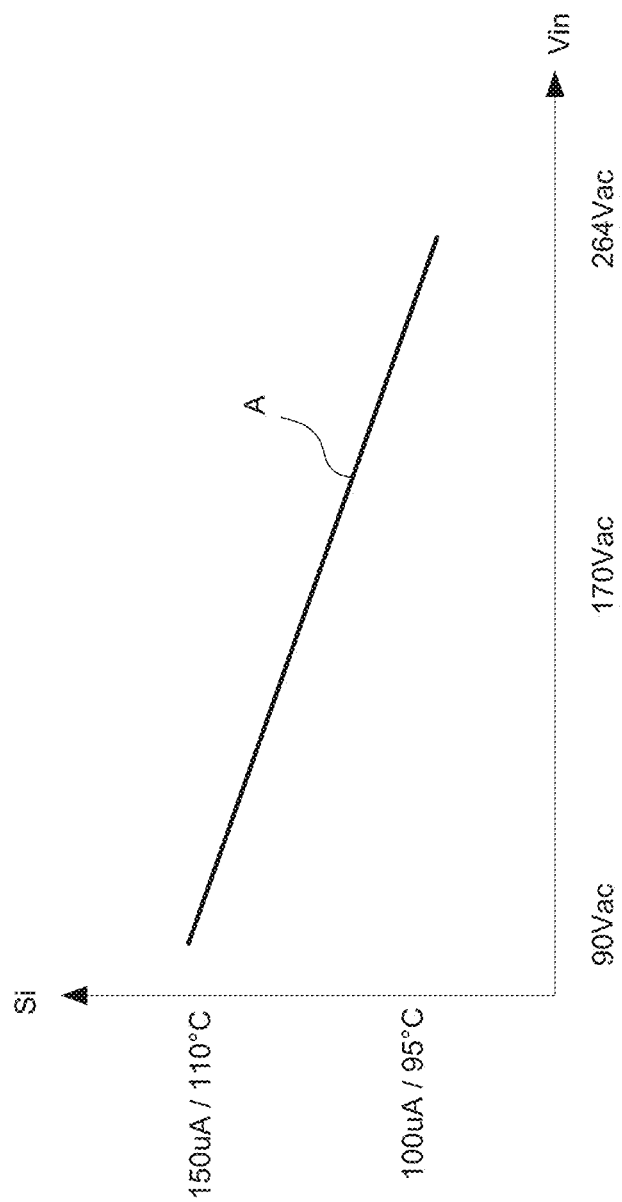
FIG. 2C is a waveform diagram of input voltage, current signal, and temperature according to the first embodiment of the present disclosure.

Please refer to FIG. 2C, which shows a waveforms of input voltage, current signal, and temperature according to the first embodiment of the present disclosure, and also refer to FIG. 1 to FIG. 2B. Take the FIG. 2A and FIG. 2B for example, when the input voltage Vin is between 90 volts and 264 volts, it is assumed that the voltage adjustment signal Sa is between 1.5 volts and 1 volt so that the current signal Si of between 150 μA and 100 μA flows to the temperature control resistor 32. If the reference voltage Vr of the comparison unit 34 is 1 volt and the input voltage Vin is 90 volts, the over temperature protection resistance of the temperature control resistor 32 is 6.66 KΩ (1 volt/150 μA=6.66 KΩ), and it is assumed that the over temperature protection point is 110° C.; the input voltage Vin is 264 volts, the over temperature protection resistance of the temperature control resistor 32 is 10 KΩ (1 volt/100 μA=10 KΩ), and it is assumed that the over temperature protection point is 95° C. Therefore, an over temperature protection point curve A can be drawn. It can be seen from the curve A that the over temperature protection point is higher when the input voltage Vin is lower, and the over temperature protection point is lower when the input voltage Vin is higher. Accordingly, a dynamic over temperature protection point can be provided so that the over temperature compensation control circuit 300 can still provide the correct over temperature protection point when the input voltage Vin is high.

For example, if the input voltage Vin is 90 volts, the input current is relatively large, and when the output current is fixed at full load, the components at the primary side and the secondary side are at high temperature, e.g. 100° C. Therefore, when the input voltage Vin is 90 volts, the detection circuit 30 adjusts the output current signal Si to 150 μA so that the temperature of the over temperature point is set to 110° C. In other words, if the input voltage Vin is 90 volts, it is determined that an over temperature condition occurs when the resistance value of the temperature control resistor 32 is low to 6.66 KΩ when due to increasing temperature.

On the other hand, if the input voltage Vin is 264 volts, the input current is relatively small, and when the output current is fixed at full load, the components at the primary side are at low temperature, e.g., 80° C. (and the secondary side are at high temperature, e.g., 100° C.). If the current signal is 150 μA and the over temperature point is set to 110° C., the temperature on the secondary side will rise to 130° C., thereby causing the temperature of components on the secondary side to be too high. Accordingly, when the input voltage Vin is 264 volts, the detection circuit 30 adjusts the outputted current signal to 100 μA so that the temperature of the over temperature point is set to 95° C. In other words, if the input voltage Vin is 264 volts, when the temperature control resistor 32 is increased in temperature so that its resistance value is as small as less than 10 KΩ, it is determined that the over temperature condition has occurred.

Figure 3A:
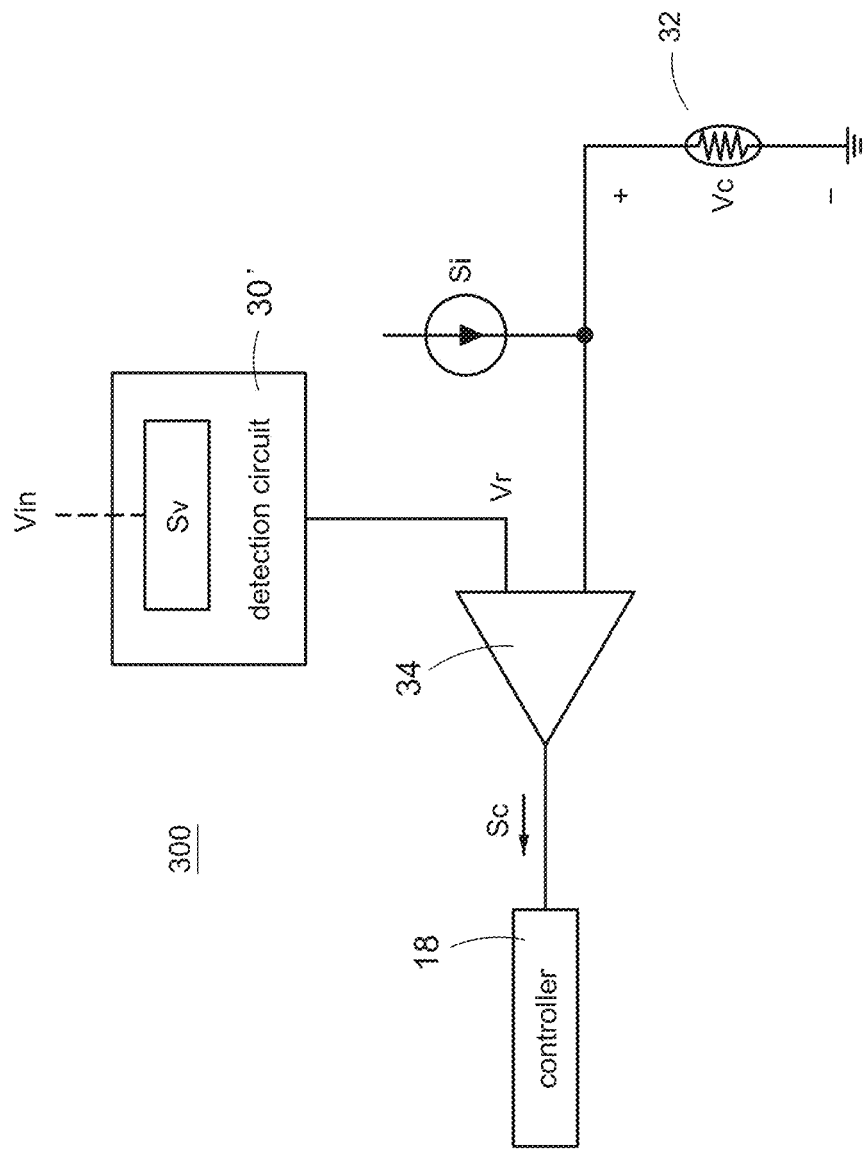
FIG. 3A is a block circuit diagram of the over temperature compensation control circuit according to a second embodiment of the present disclosure.

Please refer to FIG. 3A, which shows a block circuit diagram of the over temperature compensation control circuit according to a second embodiment of the present disclosure, and also refer to FIG. 1 to FIG. 2C. The over temperature compensation control circuit 300' includes a detection circuit 30', a temperature control resistor 32, and a comparison unit 34. The temperature control resistor 32 is coupled to the comparison unit 34. One end of the detection circuit 30' is coupled to the rectifier unit 10 or the input voltage Vin, and the other end thereof is coupled to the comparison unit 34. The detection circuit 30' provides the reference voltage Vr in response to the input voltage Vin according to the voltage signal Sv in response to the input voltage Vin, and the voltage value of the reference voltage Vr is proportional to the voltage value of the input voltage Vin. The temperature control resistor 32 may be a thermistor with a negative temperature coefficient (NTC). When the current signal Si (which is constant, e.g., 100 μA) flows through the temperature control resistor 32, a temperature control voltage Vc is generated on the temperature control resistor 32.

The comparison unit 34 compares the temperature control voltage Vc with the reference voltage Vr and provides a control signal Sc according to the comparison results. The value of the control signal Sc represents whether the temperature of the conversion unit 100 (the primary side of the transformer 12) has reached the over temperature protection point. In one embodiment, the control signal Sc is a logic level signal. When the reference voltage Vr is greater than or equal to the temperature control voltage Vc, the control signal Sc is a high logic level signal (it represents an over temperature condition); when the reference voltage Vr is less than the temperature control voltage Vc, the control signal Sc is a low logic level signal (it represents not the over temperature condition).

Figure 3B:
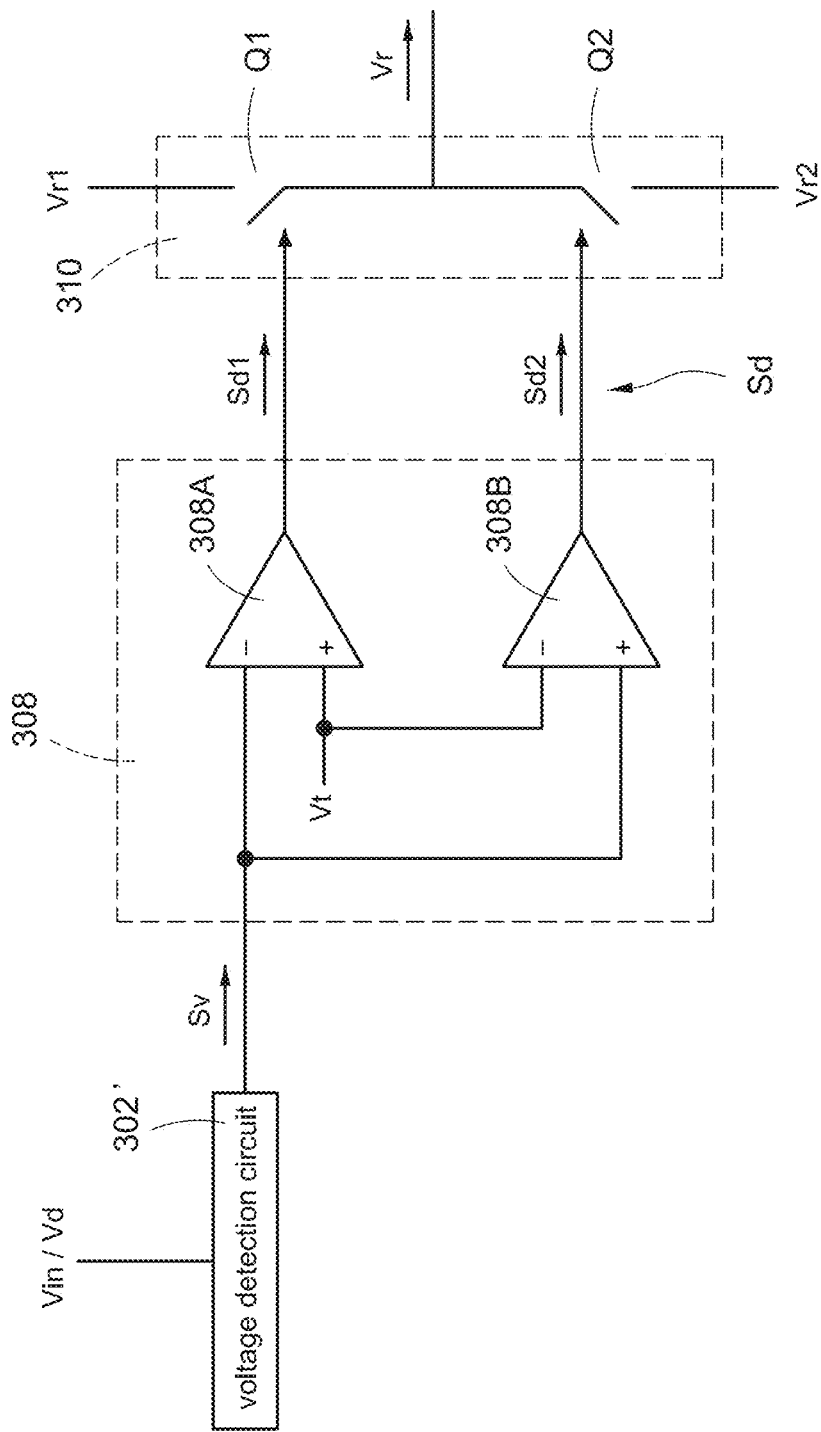
FIG. 3B is a circuit diagram of the detection circuit of the over temperature compensation control circuit according to the second embodiment of the present disclosure.

Please refer to FIG. 3B, which shows a circuit diagram of the detection circuit of the over temperature compensation control circuit according to the second embodiment of the present disclosure, and also refer to FIG. 1 to FIG. 3A. The detection circuit 30' includes a voltage detection circuit 302', a comparison circuit 308, and a voltage selection circuit 310. The comparison circuit 308 is coupled to the voltage detection circuit 302' and the voltage selection circuit 310. The voltage detection circuit 302' can be a conversion unit for converting the AC input voltage Vin into a voltage signal Sv, a voltage division circuit for dividing the DC voltage Vd into the voltage signal Sv, or a transmission path for transmitting the DC voltage Vd to the comparison circuit 308 (i.e., the DC voltage Vd is the voltage signal Sv). Specifically, since the AC input voltage Vin cannot be directly supplied to the comparison circuit 308 when the detection circuit 30' is coupled to the input voltage Vin, an additional stage of conversion unit must be used to convert the AC input voltage Vin into the DC voltage signal Sv.

In addition, since the rectifier unit 10 rectifies the AC voltage of 90 volts to 264 volts to the DC voltage Vd of 127 volts to 373 volts, if the withstand voltage of the comparison circuit 308 is insufficient, the DC voltage Vd still needs to be divided into the voltage signal Sv with smaller voltage values by the voltage division circuit for supplying to the comparison circuit 308. However, if the withstand voltage of the comparison circuit 308 is sufficient, the DC voltage Vd can be directly transmitted to supply to the comparison circuit 308. At this condition, the voltage detection circuit 302' can be a wire for providing a transmission path, and the DC voltage Vd is the voltage signal Sv. In particular, the DC voltage Vd is larger as the voltage value of the input voltage Vin is larger, and the DC voltage Vd is smaller as the voltage value of the input voltage Vin is smaller.

The comparison circuit 308 includes a first comparison unit 308A and a second comparison unit 308B. An inverting input end (−) of the first comparison unit 308A and a non-inverting input end (+) of the second comparison unit 308B receive the voltage signal Sv. A non-inverting input end (+) of the first comparison unit 308A and an inverting input end (−) of the second comparison unit 308B receive a threshold voltage Vt. The first comparison unit 308A and the second comparison unit 308B compare the voltage signal Sv and the threshold voltage Vt to respectively provide driver signals Sd. The driver signals Sd include a first driver signal Sd1 and a second driver signal Sd2. Specifically, when the voltage value of the voltage signal Sv is less than the voltage value of the threshold voltage Vt, the first comparison unit 308A provides the first driver signal Sd1; when the voltage value of the voltage signal Sv is greater than or equal to the voltage value of the threshold voltage Vt, the second comparison unit 308B provides the second driver signal Sd2. In one embodiment, the threshold voltage Vt is a turning point of an over voltage protection point, for example but not limited to, the threshold voltage Vt is corresponding to a midpoint of the range of the input voltage Vin (i.e., 177 volts). When the input voltage Vin is between 90 volts to 177 volts, the first comparison unit 308A provides the first driver signal Sd1; when the input voltage Vin is between 177 volts to 264 volts, the second comparison unit 308B provides the second driver signal Sd2.

The voltage selection circuit 310 includes series-connected a first switch Q1 and a second switch Q2, and a contact between the first switch Q1 and the second switch Q2 is coupled to the comparison unit 34. The reference voltage Vr includes a first reference voltage Vr1 and a second reference voltage Vr2, and the other end of the first switch Q1 receives the first reference voltage Vr1 and the other end of the second switch Q2 receives the second reference voltage Vr2. A control end of the first switch Q1 is coupled to the first comparison unit 308A and a control end of the second switch Q2 is coupled to the second comparison unit 308B. The first switch Q1 is turned on according to the first drive signal Sd1 so that the voltage selection circuit 310 provides the first reference voltage Vr1 to the comparison unit 34. The second switch Q2 is turned on according to the second drive signal Sd2 so that the voltage selection circuit 310 provides the second reference voltage Vr2 to the comparison unit 34. In particular, the second reference voltage Vr2 is greater than the first reference voltage Vr1 so that the voltage selection circuit 310 correspondingly outputs the first reference voltage Vr1 when the input voltage Vin is smaller and the voltage selection circuit 310 correspondingly outputs the second reference voltage Vr2 when the input voltage Vin is larger.

Figure 3C:
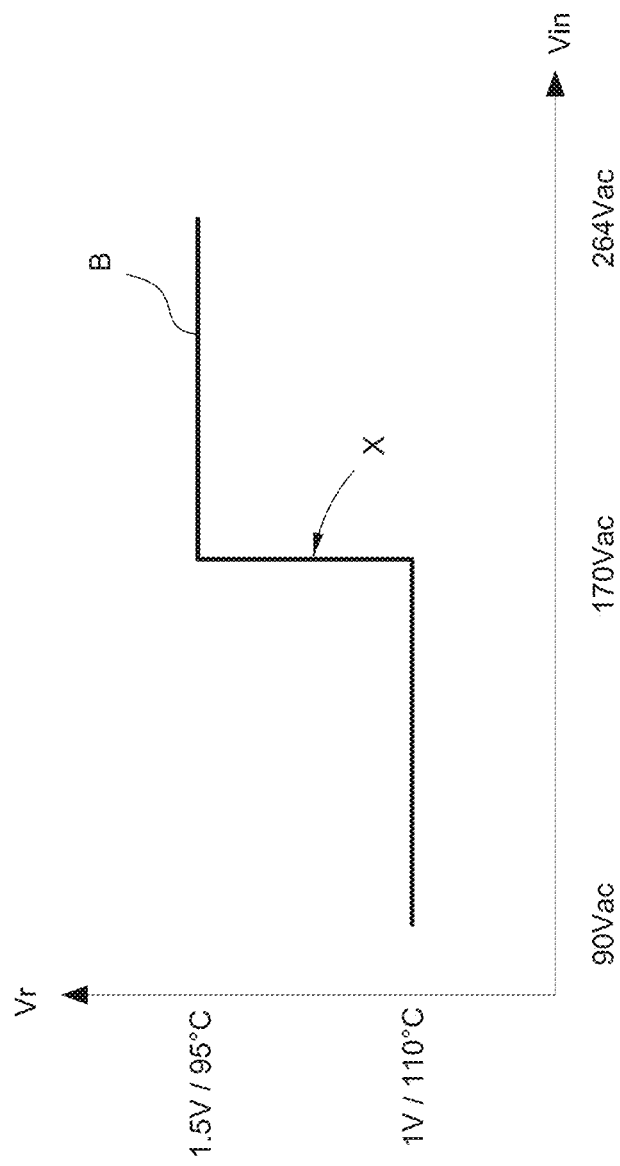
FIG. 3C is a waveform diagram of input voltage, current signal, and temperature according to the second embodiment of the present disclosure.

Please refer to FIG. 3C, which shows a waveforms of input voltage, current signal, and temperature according to the second embodiment of the present disclosure, and also refer to FIG. 1 to FIG. 3B. Take FIG. 3A and FIG. 3B for examples, it is assumed that the input voltage Vin is 90 to 264 volts, the threshold voltage Vt corresponding to the input voltage Vin is 177 volts, the current signal Si is 100 μA, the first reference voltage Vr1 (it is assumed that the over temperature protection point is 110° C.) is 1 volt, and the second reference voltage Vr2 (it is assumed that the over temperature protection point is 95° C.) is 1.5 volts. When the input voltage Vin is between 90 volts to 177 volts, the first comparison unit 308A provides the first driver signal Sd1 so that the first switch Q1 is turned on and the reference voltage Vr of 1 volt is provided. At this condition, the over temperature protection resistance of the temperature control resistor 32 is 10 KΩ (1 volt/100 μA=10 KΩ). When the input voltage Vin is between 177 volts to 264 volts, the second comparison unit 308B provides the second driver signal Sd2 so that the second switch Q2 is turned on and the reference voltage Vr of 1.5 volts is provided. At this condition, the over temperature protection resistance of the temperature control resistor 32 is 15 KΩ (1.5 volts/100 μA=15 KΩ). Therefore, an over temperature protection point curve B with a turning point X can be drawn. From this curve B, it can be seen that when the input voltage Vin is lower than the turning point X, the over temperature protection point is higher, and when the input voltage Vin is higher than the turning point X, the over temperature protection point is lower. Thereby a dynamic over temperature protection point can be provided such that the over temperature compensation control circuit 300 can still provide the correct over temperature protection point when the input voltage Vin is high. In one embodiment, the over temperature protection point can be designed with multiple turning points X. That is, the comparison circuit 308 has a plurality of comparison units and includes a plurality of threshold voltages, and a plurality of switches and reference voltages that are jointly cooperated. The circuit structure operates in a similar manner to that of FIG. 3B and FIG. 3B and will not be described again.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An over temperature compensation control circuit coupled to a conversion unit, the over temperature compensation control circuit comprising:
   a detection circuit coupled to the conversion unit and the detection circuit configured to provide a current signal responsive to an input voltage according to a voltage signal responsive to the input voltage of the conversion unit,
   a temperature control resistor coupled to the detection circuit and the temperature control resistor configured to generate a temperature control voltage according to the current signal, and
   a comparison unit coupled to the temperature control resistor and the comparison unit configured to generate a control signal by comparing the temperature control voltage with a reference voltage,
   wherein the control signal represents whether a temperature of the conversion unit reaches an over temperature protection point, and the over temperature protection point changes in response to the magnitude of the input voltage.

2. The over temperature compensation control circuit in claim 1, wherein when the input voltage is larger, the detection circuit is configured to adjust the current signal to be smaller.

3. The over temperature compensation control circuit in claim 2, wherein when the temperature control voltage is less than the reference voltage, it represents that the temperature of the conversion unit exceeds the over temperature protection point.

4. The over temperature compensation control circuit in claim 1, wherein the detection circuit comprises:
   a voltage detection circuit coupled to the conversion unit and the voltage detection circuit configured to receive an auxiliary voltage responsive to the input voltage and provide the voltage signal according to the auxiliary voltage,
   an amplifier circuit coupled to the voltage detection circuit and the amplifier circuit configured to amplify the voltage signal to a voltage adjustment signal, and
   a current mirror circuit coupled to the amplifier circuit, the temperature control resistor, and the comparison unit, and configured to generate the current signal according to a current adjustment signal responsive to the voltage adjustment signal.

5. The over temperature compensation control circuit in claim 4, wherein the voltage detection circuit comprises:
   an auxiliary induction winding coupled to a transformer of the conversion unit, and
   a voltage division circuit coupled to the auxiliary induction winding, wherein the auxiliary induction winding is configured to induce the auxiliary voltage by means of electromagnetic coupling the transformer, and the voltage division circuit is configured to divide the auxiliary voltage into the voltage signal.

6. The over temperature compensation control circuit in claim 4, wherein the auxiliary voltage is negative; the current signal is inversely proportional to the input voltage, and the resistance value of the temperature control resistor is inversely proportional to the temperature.

7. The over temperature compensation control circuit in claim 1, wherein the control signal is provided to a control unit; the control unit is configured to set a temperature hysteresis interval having an over temperature protection point and an under temperature resetting point; when the control unit is informed of that the temperature of the conversion unit reaches the over temperature protection point according to the control signal, the control unit is configured to turn off the conversion unit, and when the temperature of the conversion unit is reduced to reach the under temperature resetting point, the control unit is configured to turn on the conversion unit.

8. The over temperature compensation control circuit in claim 1, wherein the control signal is provided to a control unit; when the control unit is informed that the temperature of the conversion unit reaches the over temperature protection point according to the control signal, the control unit is configured to lock the conversion unit.

9. An over temperature compensation control circuit coupled to a conversion unit, the over temperature compensation control circuit comprising:
   a detection circuit coupled to the conversion unit and the detection circuit configured to provide a reference voltage responsive to an input voltage according to a voltage signal responsive to the input voltage,
   a temperature control resistor configured to generate a temperature control voltage according to a current signal, and
   a comparison unit coupled to the detection circuit and the temperature control resistor and the comparison unit configured to generate a control signal by comparing the temperature control voltage with the reference voltage,
   wherein the control signal represents whether a temperature of the conversion unit reaches an over temperature protection point.

10. The over temperature compensation control circuit in claim 9, wherein when the voltage signal responsive to the input voltage is less than a threshold voltage, the detection circuit is configured to adjust the reference voltage having a first reference voltage value; the voltage signal is greater than or equal to the threshold voltage, the detection circuit is configured to adjust the reference voltage having a second reference voltage value; wherein the second reference voltage value is greater than the first reference voltage value.

11. The over temperature compensation control circuit in claim 9, wherein when the temperature control voltage is less than the reference voltage, it represents that the temperature of the conversion unit exceeds the over temperature protection point.

12. The over temperature compensation control circuit in claim 9, wherein the detection circuit comprises:
   a voltage detection circuit coupled to the conversion unit and the voltage detection circuit configured to receive the input voltage or a DC voltage responsive to the input voltage and provide the voltage signal according to the input voltage or the DC voltage,
   a comparison circuit coupled to the voltage detection circuit and the comparison circuit configured to compare the voltage signal with a threshold voltage to provide a drive signal, and
   a voltage selection circuit coupled to the comparison circuit and the comparison unit and the voltage selection circuit configured to receive the drive signal and select the appropriate reference voltage according to the drive signal.

13. The over temperature compensation control circuit in claim 12, wherein the comparison circuit comprises:
   a first comparison unit configured to receive the voltage signal and the threshold voltage, and
   a second comparison unit configured to receive the voltage signal and the threshold voltage,
   wherein the drive signal comprises a first drive signal and a second drive signal; the first comparison unit is configured to compare the voltage signal with the threshold voltage to provide the first drive signal to the voltage selection circuit, and the second comparison unit is configured to compare the voltage signal with the threshold voltage to provide the second drive signal to the voltage selection circuit.

14. The over temperature compensation control circuit in claim 12, wherein the voltage selection circuit comprises:
   a first switch coupled to the comparison circuit and the comparison unit and the first switch configured to receive a first reference voltage, and
   a second switch coupled to the comparison circuit and the comparison unit and the second switch configured to receive a second reference voltage,
   wherein the voltage selection circuit is configured to turn on the first switch or the second switch according to the drive signal; when the first switch is turned on, the voltage selection circuit is configured to use the first reference voltage as the reference voltage, and when the second switch is turned on, the voltage selection circuit is configured to use the second reference voltage as the reference voltage.

15. The over temperature compensation control circuit in claim 9, wherein the reference voltage is proportional to the input voltage, and a resistance value of the temperature control resistor is inversely proportional to the temperature.

* * * * *